(12) United States Patent
Johnson

(10) Patent No.: US 7,001,869 B2
(45) Date of Patent: Feb. 21, 2006

(54) SEED TREATMENT AND METHOD OF TREATING SEED

(76) Inventor: William S. Johnson, 2439 Jakes Pl., Moses Lake, WA (US) 98837

( * ) Notice: Subject to any disclaimer, the term of this patent is extended or adjusted under 35 U.S.C. 154(b) by 189 days.

(21) Appl. No.: 10/246,093

(22) Filed: Sep. 17, 2002

(65) Prior Publication Data
US 2004/0063582 A1    Apr. 1, 2004

(51) Int. Cl.
*C05G 3/02*    (2006.01)

(52) U.S. Cl. .................. 504/100; 504/101; 504/116.1; 504/118; 504/241; 504/284; 504/297; 71/23; 71/31

(58) Field of Classification Search ............... 504/100, 504/101, 116.1, 118, 241, 284, 297; 71/23, 71/31
See application file for complete search history.

(56) References Cited

U.S. PATENT DOCUMENTS

| | | | | |
|---|---|---|---|---|
| 4,591,379 A | * | 5/1986 | Kovacs et al. | 504/245 |
| 5,130,325 A | * | 7/1992 | Smith | 514/389 |
| 5,549,729 A | * | 8/1996 | Yamashita | 71/26 |
| 5,634,959 A | | 6/1997 | Beaty | 71/16 |
| 5,876,479 A | | 3/1999 | Hedgpeth, IV | 71/11 |
| 5,994,265 A | | 11/1999 | Barclay et al. | 504/100 |
| 6,077,695 A | | 6/2000 | Nilsson | 435/84 |
| 6,318,023 B1 | | 11/2001 | Yamashita | 47/58.1 |
| 6,322,606 B1 | * | 11/2001 | Komoriya et al. | 71/11 |
| 2001/0044381 A1 | | 11/2001 | Dean | 504/138 |
| 2002/0137631 A1 | * | 9/2002 | Falder et al. | 504/150 |

FOREIGN PATENT DOCUMENTS

JP      11-158019    *   6/1999

OTHER PUBLICATIONS

Abstract of JP 11-158019, Jun. 15, 1999.*
http://www.americanagritech.com/karma.html: Liquid Karma™ Bio-catalyst Plant Stimulant by a PhD Plant Physiologist: 4 pages; Aug. 27, 2002.

* cited by examiner

*Primary Examiner*—S. Mark Clardy
(74) *Attorney, Agent, or Firm*—Wells St. John P.S.

(57) ABSTRACT

The invention includes a seed treatment composition containing plant macronutrients, micronutrients, a pest inhibitor and at least one growth regulator. The composition additionally contains a vitamin component, an amino acid component, a penetrant and an energy source. The invention also includes treated seed having a treatment material on at least a portion of a seed surface. The treatment material contains macronutrients, micronutrients, vitamins, humic acid, a pest inhibitor, a mold inhibitor, an absorbant, a penetrant and growth regulators. The invention includes methods of formulating seed treatment compositions and methods of treating seeds.

3 Claims, 1 Drawing Sheet

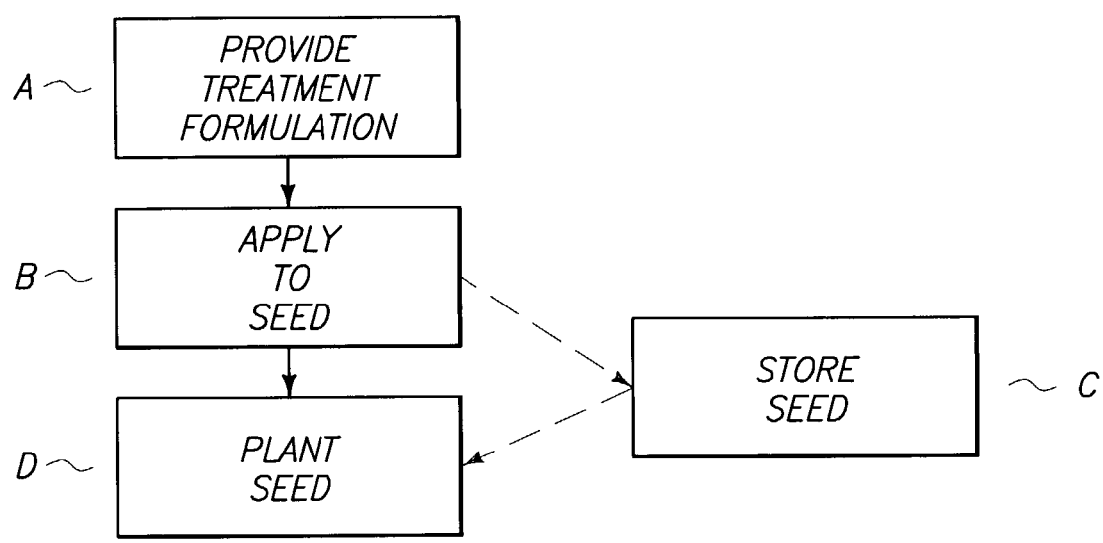

SEED TREATMENT AND METHOD OF TREATING SEED

TECHNICAL FIELD

The invention pertains to seed treatment compositions, treated seeds, methods of forming compositions and methods of treating seeds.

BACKGROUND OF THE INVENTION

Seed germination and plant growth can be affected by a variety of factors, including both edaphic and climatic conditions. The availability of nutrients in the soil can affect not only the growth of the present plant population, but can also affect the amount of nutrients available for incorporation into seed produced by the plant. When a resulting seed is deficient in one or more nutrients, the germination rate and subsequent plant growth can be impaired.

Harsh environments can also detrimentally influence germination and growth. Arid conditions, phytotoxins released by competing plant life, and the presence of well established or hardy competition can have a negative effect on the ability of a seed to germinate, grow and survive.

It would be desirable to provide seed treatments to alleviate nutrient deficiencies and enhance seed germination and growth.

SUMMARY OF THE INVENTION

In one aspect the invention encompasses a seed treatment composition. The composition contains at least one plant macronutrient, at least one plant micronutrient, a pest inhibitor and at least one growth regulator. The composition additionally contains a vitamin/cofactor component having at least one of a vitamin, a metal ion cofactor, a coenzyme and a coenzyme precursor. The composition also includes an amino acid component, a penetrant and an energy source.

In one aspect the invention encompasses a treated seed which has a treatment material on at least a portion of a surface of the seed. The treatment material contains macronutrients from the group including nitrogen, sulfur, potassium, phosphorus, calcium and magnesium; and contains micronutrients from the group including iron, manganese, zinc, copper, boron, molybdenum and cobalt. The treatment material also contains vitamins from the group thiamine, riboflavin, niacin, pyridoxine, panthenol and cyanocobalamin. Additionally, the treatment material contains humic acid, a pest inhibitor, a mold inhibitor, an absorbant, a penetrant and growth regulators from the group including cytokinins, auxins and gibberellins.

In one aspect the invention includes methods of formulating seed treatment compositions and methods of treating seeds.

BRIEF DESCRIPTION OF THE DRAWINGS

Preferred embodiments of the invention are described below with reference to the following accompanying drawing.

The FIGURE shows a flowchart diagram illustrating a particular aspect of the present invention.

DETAILED DESCRIPTION OF THE PREFERRED EMBODIMENTS

The invention encompasses compositions which can be utilized for treating seed. For purposes of the present description the term "seed" is not limited to a particular type of seed and can refer to seed from a single plant species, a mixture of seed from multiple plant species, or a seed blend from various strains within a plant species. The described compositions can be utilized to treat gymnosperm seed, dicotyledonous angiosperm seed and monocotyledonous angiosperm seed. Compositions according to the present invention can be particularly useful for treatment of seed which will be utilized in applications including but not limited to home gardening, crop production, forestry applications, and government rehabilitation programs.

Compositions according to the present invention can comprise one or more macronutrients. For purposes of the present description, the term "macronutrient" can refer to an element for plant growth which is utilized by plants in proportionally larger amounts relative to micronutrients. For most plant species and for purposes of the present description, macronutrients include nitrogen, potassium, phosphorus, calcium, magnesium and sulfur. Compositions of the present invention can include various combinations and relative amounts of individual macronutrients. Preferably, compositions include both phosphorous and potassium. In particular embodiments, compositions of the present invention include each of the listed macronutrients.

A variety of materials are available to provide macronutrients to the composition. Exemplary substances which may be utilized to provide nitrogen include ammonium sulfate, ammonium nitrate, fish protein digest, ammonium phosphate sulfate, phosphate nitrate, diammonium phosphate, ammoniated single superphosphate, ammoniated triple superphosphate, nitric phosphates, ammonium chloride, calcium nitrate, calcium cyanamide, sodium nitrate, urea, urea-ammonium nitrate solution, nitrate of soda potash, potassium nitrate, amino acids, proteins, nucleic acids and combinations thereof. Commercially available fish protein digests that can be utilized in compositions of the invention include, for example, SEA-PROD™ (Soil Spray Aid, Inc., Moses Lake, Wash.); MERMAID™ (Integrated Fertility Management (IFM), Wenatchee, Wash.); and OCEAN HARVEST™ (Algro Farms, Selah, Wash.).

Exemplary phosphate materials that can be utilized include mono-potassium phosphate, superphosphate (single/double or triple), phosphoric acid, ammonium phosphate sulfate, ammonium phosphate nitrate, diammonium phosphate, ammoniated superphosphate (single, double or triple), nitric phosphates, potassium pyrophosphates, sodium pyrophosphate, nucleic acid phosphates, and combinations thereof.

Exemplary potassium materials which can be utilized include mono-potassium phosphate, potassium chloride, potassium sulfate, potassium gluconate, sulfate of potash magnesia, potassium carbonate, potassium acetate, potassium citrate, potassium hydroxide, potassium manganate, potassium molybdate, potassium thiosulfate, potassium zinc sulfate, and combinations thereof.

Calcium containing materials that can be utilized in compositions of the invention include, but are not limited to, powdered milk, calcium ammonium nitrate, calcium nitrate, calcium cyanamide, calcium acetate, calcium acetylsalicylate, calcium borate, calcium borogluconate, calcium carbonate, calcium chloride, calcium citrate, calcium ferrous citrate, calcium glycerophosphate, calcium lactate, calcium oxide, calcium pantothenate, calcium propionate, calcium saccharate, calcium sulfate, calcium tartrate, and mixtures thereof.

Exemplary magnesium materials for utilization in compositions of the present invention include magnesium sulfate, magnesium oxide, dolomite, magnesium acetate, magnesium benzoate, magnesium bisulfate, magnesium borate, magnesium chloride, magnesium citrate, magnesium nitrate, magnesium phosphate, magnesium salicylate, and combinations thereof.

Exemplary sulfur containing materials for utilization in the compositions include magnesium sulfate, ammonium phosphate sulfate; calcium sulfate, potassium sulfate, sulfuric acid, cobalt sulfate, copper sulfate, ferric sulfate, ferrous sulfate, sulfur, cysteine, methionine, and combinations thereof.

Compositions of the present invention can comprise one or more micronutrients. For purposes of the present invention the term "micronutrients" refers to an element utilized by plants during growth which are used in smaller amounts relative to macronutrients. Typically, and for purposes of the present description, plant micronutrients include iron, manganese, zinc, copper, boron, molybdenum and cobalt. Numerous compounds and substances are available to provide micronutrients to compositions of the present invention. Exemplary zinc containing compounds include chelated zinc, zinc sulfate, zinc oxide, zinc acetate, zinc benzoate, zinc chloride, zinc bis (dimethyldithiocarbamate), zinc citrate, zinc nitrate, zinc salicylate, and combinations thereof.

Exemplary iron containing materials which can be utilized in compositions of the present invention include chelated iron, ferric chloride, ferric citrate, ferric fructose, ferric glycerophosphate, ferric nitrate, ferric oxide, ferrous chloride, ferrous citrate, ferrous fumarate, ferrous gluconate, and ferrous succinate, and combinations thereof.

Exemplary manganese containing materials which can be utilized include manganese sulfate, manganese acetate, manganese chloride, manganese nitrate, manganese phosphate, and combinations thereof.

Exemplary cobalt materials which can be utilized in compositions of the present invention include cyanocobalamin, cobaltic acetate, cobaltous chloride, cobaltous oxalate, cobaltous potassium sulfate, cobaltous sulfate, and combinations thereof.

Various combinations and relative amounts of micronutrients can be utilized in the compositions of the present invention. Preferably, compositions include at least zinc, iron and manganese, and in particular embodiments the compositions comprises at least zinc, iron, manganese and cobalt.

The presence and amounts of individual macronutrients and micronutrients in a particular composition can vary depending on factors such as the condition of the soil from which the seed was produced and the soil conditions existing where the seed will be planted. For example, if a seed is to be planted in an area that is known to be deficient in one or more macronutrients or micronutrients, the corresponding macronutrients and micronutrients can be provided in the composition in amounts sufficient to partially or completely compensate for such deficiency. A deficiency in one or more nutrients can also occur within a seed when such seed has been produced under conditions where the soil is deficient in those nutrients. When such intra-seed deficiency exists, the corresponding macronutrients and micronutrients in which the seed is deficient can be provided within compositions of the invention, in amounts sufficient to partially or completely compensate for such deficiency.

It is not unusual for the soil conditions from whence seed originated to be unknown. Additionally, a seed supply can contain seed originating from numerous locations. Further, it may be unknown at the time of treating seed where the particular seed will be planted. Accordingly, it can be advantageous to provide individual macronutrients and micronutrients to the composition in an amount sufficient to alleviate potential deficiencies. It can be most preferred to provide all the listed micronutrients and macronutrients in the composition with each present in an amount sufficient to at least partially compensate for any deficiency in the corresponding nutrient, whether the deficiency occurs in the soil from whence the seed originated or in the soil into which the seed will be planted. Conversely, if soil conditions are known to be such that any individual nutrient is present in abundance, and that supplemental amounts will not further benefit the seed, such nutrient can be omitted from the composition. ;

Compositions of the present invention can further contain any of a number of vitamins and cofactors important for plant germination and growth. For purposes of the present description the term "cofactor" can be referred to as a metal ion cofactor, a coenzyme or a coenzyme precursor. Exemplary vitamins and cofactors for utilization in compositions of the present invention include thiamine, riboflavin, niacin (nicotinic acid and/or niacinamide), pyridoxine, panthenol, cyanocobalamin, citric acid, folic acid, biotin and combinations thereof. Preferably, compositions of the present invention comprise each of folic acid, biotin, panthenol (and/or panthothenic acid), riboflavin and thiamine. More preferably, the composition can comprise some form of each of the listed vitamins and cofactors.

The listed vitamins and cofactors can be provided in the composition in any form including vitamin derivatives and provitamin forms. Optionally, one or more alcohols can be utilized in the composition to enhance the activity and aid in the preservation of one or more vitamins. An exemplary alcohol which may be utilized is benzyl alcohol.

Exemplary forms of thiamine which can be utilized in compositions of the present invention include thiamine hydrochloride, thiamine pyrophosphate, thiamine monophosphate, thiamine disulfide, thiamine mononitrate, thiamine phosphoric acid ester chloride, thiamine phosphoric acid ester phosphate salt, thiamine 1,5 salt, thiamine triphosphoric acid ester, thiamine triphosphoric acid salt, yeast, yeast extract, and various combinations thereof.

Exemplary forms of riboflavin for utilization in compositions of the present invention include riboflavin, riboflavin acetyl phosphate, flavin adenine dinucleotide, flavin adenine mononucleotide, riboflavin phosphate, yeast, yeast extract and combinations thereof.

Niacin materials which can be comprised by compositions of the present invention include but are not limited to niacinamide, nicotinic acid, nicotinic acid adenine dinucleotide, nicotinic acid amide, nicotinic acid benzyl ester, nicotinic acid monoethanolamine salt, yeast, yeast extract, nicotinic acid hydrazide, nicotinic acid hydroxyamate, nicotinic acid-N-(hydroxymethyl) amide, nicotinic acid methyl ester, nicotinic acid mononucleotide, nicotinic acid nitrite and combinations thereof.

Pyridoxine and substances which can be utilized in compositions of the invention include pyridoxine hydrochloride, pyridoxal phosphate, yeast and yeast extract. Folic acid materials that can be utilized for compositions of the present invention include but are not limited to folic acid, yeast, yeast extract and folinic acid.

Biotin compounds and materials which can be utilized in compositions of the present invention include biotin, biotin sulfoxide, yeast, yeast extract, biotin 4-amidobenzoic acid, biotin amidocaproate N-hydroxysuccinimide ester, biotinyl 6-aminoquinoline, biotin hydrazide, biotin methyl ester, d-biotin-N-hydroxysuccinimide ester, biotin-maleimide, d-biotin p-nitrophenyl ester, biotin propranolol, 5-(N-biotinyl)-3-aminoallyl)-uridine 5'-triphosphate, biotinylated urdidine 5'-triphosphate, N-e-biotinyl-lysine, and combinations thereof.

Panthothenic acid materials for utilization in the compositions can include yeast, yeast extract and coenzyme A. Exemplary cyanocobalamin materials include but are not limited to yeast and yeast extract.

Compositions of the present invention can comprise seaweed extract to provide one or more growth regulators and various amino acids, to the composition. Growth regulators provided by the seaweed extract can include cytokinins, auxins, and gibberellins. It can be advantageous to provide seaweed extract to the composition to supply growth regulators and amino acids in a single source. It is to be understood however that the invention contemplates utilization of multiple sources to provide the various growth regulators and amino acids. Individual amino acids which can be added independently or in combination include alanine, arginine, aspartic acid, cysteine, glycine, glutamic acid, histidine, isoleucine, leucine, lysine, methionine, phenylalanine, proline, serine, tryptophan, tyrosine and valine.

Various seaweed extracts are commercially available which can be utilized in compositions of the present invention. Either cold or hot processed seaweed extract can be utilized. Exemplary commercially available seaweed extracts which can be utilized in compositions of the present invention include ACADIAN™, produced by Acadian Sea Plants Limited, Dartmouth, Nova Scotia, Canada; MAXICROP®, produced by Maxicrop International Limited, Corby Northamptonshire, UK; and ALGEA® produced by Algea A.S., Oslo, Norway.

Formulations encompassed by the present invention can comprise a variety of plant extracts. Exemplary extracts include cayenne pepper, lemon extract, garlic extract and peppermint oil. Alternatively, these ingredients can be included in the composition in powdered form. The addition of one or a combination of the listed plant extracts can advantageously inhibit various pests such as birds, rodents and insects without detrimental effects on the seed. The inclusion of one or more of these pest inhibitors can be particularly advantageous when techniques such as aerial planting are utilized where seed is distributed without drilling the soil or covering the seed. Additionally, plant extracts such as garlic extract can inhibit molding. Extracts such as lemon extract and citric acid can function as penetrants, and peppermint and lemon can confer a more pleasant odor to the resulting formulation.

A water absorbant can be included in compositions of the present invention. Numerous absorbants are available for utilization in compositions of the present invention. Exemplary absorbants include various starches and starch copolymers. Particular compositions can comprise a starch-acrylate copolymer, such as starch potassium acrylate copolymer.

A penetrant can be included in compositions of the present invention. Numerous penetrants are available for utilization including, but not limited to, dimethylsulfoxide (DMSO). Because of their ability to act as penetrants, lemon extract and citric acid can be utilized as penetrants in the composition, and can optionally be utilized in combination with one or more additional penetrants.

Compositions of the present invention can optionally comprise one or more mold inhibitors. Numerous mold inhibitors are available for utilization in compositions of the present invention. Preferably, a mold inhibitor can comprise one or more of a dimethylhydantoin derivative and nipicide (o-benzyl-p-chlorophenol). It can be advantageous to utilize dimethylhydantoin, nipicide or mixtures thereof due to the relatively low toxicity of these compounds as compared to alternative mold inhibitors. In particular embodiments, it can be preferable to utilize dimethylhydantoin in an absence of nipicide due to nipicide's unpleasant odor.

Compositions of the present invention can additionally comprise various carbohydrates. Exemplary carbohydrates include algin acid, mannitol and laminarin, each of which is present in seaweed extract. It is to be understood that the compositions of the present invention encompass utilization of other carbohydrates which can be present independently or in combination with the carbohydrates provided by the seaweed extract.

Compositions of the present invention can further comprise at least one of humic acid and fulvic acid. In particular compositions, humic acid can preferably be included to chelate trace elements and thereby inhibit formation of complexes between the trace elements and other components such as, for example, sulfates. Humic acid can additionally be utilized as a source of carbon during seed germination and plant growth.

Fulvic acid can be utilized to achieve a desired pH of the composition. Compositions according to the present invention are not limited to a particular pH, can preferably comprise an acidic pH, and more preferably have a pH between about 5.3 and about 6.8. A pH in the range of from about 5.3 to about 6.8 can be beneficial since this pH range can inhibit complex formation between trace elements and other components such as sulfates. It can be advantageous to utilize fulvic acid to adjust the pH since fulvic acid can additionally be utilized as a carbon source. It is to be understood, however, that the invention contemplates utilization of alternative or additional agents for adjusting pH of the composition.

Compositions of the present invention are preferably formulated in the form of an aqueous solution. The amount of added water utilized in composition formation will depend upon the particular components and whether the components are in a dry form, in a liquid form or in solution when added to the formulation.

An exemplary preferred composition according to the present invention is set forth in table 1. Table 1 indicates relative amounts of all components of the embodiment other than water. The specified amounts are based on a final volume of about 25 gallons in the absence of added water. It is to be understood that the specific amount of each component indicated in the table is within a preferred range for the specific material utilized in the embodiment. When the sources listed are utilized for producing the composition, the amount indicated is the amount most preferred and is within a preferred range that includes a deviation of up to about +/−25% from the specified amount.

TABLE 1

Example Seed treatment Composition

| Component | Source Material(s) | Amount of Source Material |
|---|---|---|
| Nitrogen | Ammonium Sulfate | 15 lb |
|  | Fish Protein Digest | 4 lb |
| Phosphate | Mono-potassium Phosphate | 51 lb |
| Potassium | Mono-potassium Phosphate | 24 lb |
| Calcium | Calcium Nitrate | 0.5 lb |
| Magnesium | Magnesium Sulfate | 4 lb |
| Zinc | Chelated zinc 14% | 0.5 lb |
| Iron | Chelated Iron | 0.5 lb |
| Manganese | Manganese Sulfate | 0.625 lb |
| Cobalt | Cyanocobalamin | 0.0661 lb |

TABLE 1-continued

Example Seed treatment Composition

| Component | Source Material(s) | Amount of Source Material |
|---|---|---|
| Thiamine | Thiamine hydrochloride | 0.0661 lb |
| Riboflavin | Riboflavin | 0.0044 lb |
| Niacin | Niacinamide | 0.0661 lb |
| Pyridoxine | Pyridoxine hydrochloride | 0.0066 lb |
| Panthenol | Panthenol | 0.0066 lb |
| Cyanocobalamin | Cyanocobalamin | 0.661 lb |
| Citric acid and benzyl alcohol | Vitamin B Complex | 0.0044 lb |
| Cytokinins, Auxins, Gibberillins, Alanine, Arginine, Aspartic acid, Cysteine, Glycine, Glutamic acid, Histidine, Isoleucine, Leucine, Lysine, Methionine, Phenylalanine, Proline, Serine, Tryptophan, Tyrosine, Valine, Algin acid, Mannitol, Laminarin | Seaweed Extract | 50 lb |
| Cayenne | Cayenne Pepper (powder) | 0.125 lb |
| Lemon Extract | Lemon Concentrate | 0.125 gallons |
| Garlic Extract | Garlic Concentrate | 0.125 gallons |
| Peppermint Oil | Peppermint Oil Concentrate | 0.039 gallons |
| Absorbant | Starch Potassium Acrylate copolymer | 1.5 lb |
| Penetrant | Dimethyl Sulfoxide | 0.125 gallons |
| Mold Inhibitor | Dimethylhydantoin | .047 gallons |
| Humic Acid | Humic Acid | 6 gallons |
| Fulvic Acid | Fulvic Acid | As needed |

The preferred ranges when alternative source materials are utilized can be calculated by converting the amounts indicated in table 1 into relative molar ratios. Once the molar ratios have been calculated, the preferred range of each component will be +/−25% of the molar ratio for the specific component. These values can then be utilized to determine the appropriate amount of material to use when alternative source materials are utilized (discussed above).

Compositions according to the present invention can be formulated as a concentrated stock or as a ready to use product. An exemplary concentrated stock composition can comprise the components as set forth in table 1 and at least about 13 gallons of water. An exemplary ready to use composition which can be directly applied to seed can comprise those ingredients as set forth in table 1 and up to about 63 gallons of water. It is to be understood that compositions of the present invention can include a wide range of water content, a preferred range being from about 13 to about 63 gallons of water when the specified amounts and source materials indicated in table 1 are utilized. Typically, the water content of the composition can be from about 34% to about 72%, by volume.

Methods of preparing and utilizing compositions according to the invention are described generally with reference to the FIGURE. A formulation for treating seeds can be provided in an initial step (A). Step (A) can comprise preparation of the formulation.

Preparation of compositions according to the present invention is not limited to any specific order of addition of components. In particular aspects it can be preferable to form an initial mixture comprising water, micronutrients and humic acid. Preferably, micronutrients are added individually, however, the order of their addition can be arbitrary. Formation of the initial mixture can preferably comprise addition of humic acid subsequent to the addition of micronutrients. It can be advantageous to form the initial mixture prior to addition of the remaining components to allow humic acid to chelate micronutrients and thereby inhibit complex formation with other ingredients.

Forming the initial mixture can also comprise adding a fish protein digest. Preferably, the fish protein digest is added after the addition of micronutrients and humic acid. Forming the initial mixture can comprise mixing utilizing, for example, rapid mechanical agitation or hydraulic agitation.

After formation of the initial mixture, the remaining components can be added. A preferred order for addition of the remaining components can be as follows: starch polymer; phosphate; potassium; seaweed extract; mold inhibitor; ammonium sulfate; magnesium sulfate; peppermint oil; vitamins/cofactors, citric acid; benzyl alcohol; lemon extract; penetrant; garlic extract; and cayenne. Mixing is preferably continued throughout the addition of components.

The pH of the formulation can be maintained within the preferred range (discussed above) throughout the mixing process and can be adjusted when necessary with, for example, fulvic acid. Alternatively, the pH can be adjusted after addition of all other components by adding an appropriate amount of fulvic acid to achieve a pH within the desired range.

As discussed above, compositions of the present invention can be prepared in a concentrated form or in a ready-to-apply form. Accordingly, the amount of water utilized in step (A) can vary to produce the desired concentration. For example, preparation of a concentrated stock can utilize enough water to result in a composition that can be further prepared for use by adding two parts of water per one part of concentrated stock. It is to be understood that stock solutions comprising alternative concentrations are contemplated by the invention.

Step (A) can comprise storage of the prepared treatment formulation. The treatment formulation can be stored in either concentrated or ready-to-apply form. The length of storage is not limited. Storing the prepared treatment formulation can preferably comprise storing at a temperature above freezing and more preferably from about 45° F. to about 85° F. It can be preferable to store the composition out of direct sunlight to prolong the activity of any light sensitive ingredients. In compositions that will be stored; prior to use, the compositions can preferably comprise at least one mold inhibitor (discussed above) to inhibit molding of the product during storage.

Preparation of the treatment formulation in step (A) can comprise removing at least some of any solids that remain in the formulation. Particularly in applications which, will comprise a spray nozzle for applying the product to seed, it can be preferable to remove particles that can potentially clog the nozzle. Exemplary methods for removing at least some of the solids from the composition include filtering the composition, for example, by passing the composition through a mesh screen. Typically, a 40 mesh screen can sufficiently remove particles to alleviate or prevent clogging of most sprayers. An appropriate range of screen sizes for utilization in step (A) can be from about 40 mesh to about 80 mesh with a 60 mesh screen being preferred. Alternatively, the formulation can be passed first through a 40 mesh screen and subsequently through a finer screen such as, for example, an 80 mesh screen. It is to be understood that in applications that will not comprise passing the formulation through a nozzle or other apparatus comprising small pore sizes, the particulate removal step can be omitted.

The formulated composition from step (A) can be applied to seed in step (B). Application of the seed treatment composition is not limited to any specific method and can comprise, for example, soaking the seed in the treatment composition or spraying the composition onto the seed. In applications comprising soaking of seed in the composition, more complete seed coverage can be possible relative to some spray techniques. However, soaking can take longer relative to spraying, and can potentially increase seed spoilage if seed is not to be planted soon after treatment.

Where application of the composition to seed comprises spraying, any conventional seed spray technique and spray apparatus can be utilized. Exemplary spray systems that can be utilized include motorized spray systems, gravity flow spray systems, hand-held; spray systems and stationary spray systems. Step (B) can comprise, for example, spraying seed as it is transferred to a mixer by way of an auger or as the seed is mixed or blended.

Formulations of the present invention can be applied to any type of seed. Accordingly, the type of seed utilized in step (B) is not limited to any specific type. The formulation can be applied to gymnosperm seed, for example conifer seed, and can be applied to angiosperm seed including both dicotyledonous and monocotyledonous seed. Step (B) can comprise applying seed treatment of the present invention to a single variety of seed or to a seed mixture. For purposes of the present description a "seed mixture" can be a mixture of seed originating from a variety of locations, can refer to a mixture or blend of seed varieties within a species or can refer to a mixture of seed species.

The amount of seed treatment applied to seed in step (B) can vary depending upon the type of seed being treated, the soil conditions from which the seed originated and the soil conditions into which the seed will be planted. Typically, one gallon of seed treatment formulation (in diluted, ready-to-apply form) can treat about one ton of seed.

Treatment application step (B) can comprise combining compositions of the present invention with other available seed treatment compositions. For example, current methods of treating seeds include encapsulating seeds with a coating to form a seed "capsule". The seed capsule can be formed primarily to provide a uniform seed size, shape or both. Encapsulation can be advantageous to produce a smoother and or rounder shape which can assist in the passing of the seed through various seed processing and planting equipment. Compositions of the present invention can be added to materials used for encapsulation and the combined mixture can be used for simultaneous treatment and encapsulation of seeds. Alternatively, seed treatment of the present invention can be applied to seed independently of the encapsulation material, preferably prior to encapsulation.

As shown in the FIGURE, once the seed treatment composition has been applied to seed in step (B), the seed can be planted in step (D). Optionally, a storage step (C) can be included whereby the treated seed is stored prior to planting.

In particular instances it can be advantageous to store treated seed prior to planting. Germination rates of seed can vary depending upon the length of time a seed has been stored between harvesting of the seed and subsequent planting of the seed. For purposes of the present description the term "germination rate" refers to the percent of a seed population that germinates. Various types of seed can have different optimal storage periods for maximization of the germination rate of the seed. As an example, seed such as wheat achieves an optimal germination rate about two growth seasons after seed harvest. In other words, if the wheat is harvested in the fall of year one and the harvested seed is planted in the fall of year two or spring of year three, the germination rate will be higher than if the seed was planted earlier. Additionally, the planting period to achieve optimal germination rates are often brief, with germination rates declining with increased storage time beyond the optimal year. Therefore, it can be beneficial to store the seed and plant the seed within the optimal period to maximize germination rates.

Optimal planting time for maximization of seed germination rate will vary based upon specific seed type. Additionally, certain seeds such as cereal grains have intrinsically high germination rates relative to other seed types. Accordingly, for some seed types it can be preferable to store the seed through one or more growing seasons prior to planting based on the optimal planting period for the particular seed.

As depicted in the FIGURE, the seed can be stored after treating with compositions of the present invention. It can be advantageous to treat the seed prior to storage of the seed since compositions of the present invention can increase the shelf life of the seed, extending the optimal time for planting the seed over a longer period of time. Alternatively, seed can be stored prior to application of the seed treatment of the present invention (not shown).

In certain applications seed can be harvested, treated with the treatment formulation, and planted within a single 12 month period. Due to the ability of the composition to increase germination rates, storage times can be advantageously minimized while still achieving a relatively high germination rate for the treated seed.

Seed treatment utilizing compositions of the present invention can enhance the germination rate of seed as much as 11% over untreated seed which has been otherwise processed identically. For seeds having intrinsically high germination rates (for example rice which can have a germination rate of over 90%) the percent increase in germination rate attainable utilizing compositions of the present invention is not as high as for those increases observed in other seed types, however significant increases are still conferred.

Planting of treated seed in step (D) can utilize any conventional method typically utilized for planting the particular seed type. As discussed above, when no-drill techniques such as aerial planting will be utilized it can be particularly advantageous to provide pest inhibitors in the treatment formulation since the seed will be distributed over the surface of the ground and will remain uncovered.

In addition to the observed increase in germination rates, post germination plants resulting from seed treated with compositions of the present invention can have increased survivability due to an improved root system afforded by the components of the present invention. This additional benefit makes compositions of the present invention particularly attractive for utilization in harsh environments such as post-fire rehabilitation projects, planting in desert areas and in locations where phytotoxins are released into the soil by competing plant life. It is to be understood that the compositions of the present invention can be advantageously used on any seed type to promote increased germination rates, vigor and hardiness, thereby allowing resulting seedlings and growing plants to better compete.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A method of preparing a seed for no-drill planting comprising:
    providing a seed;
    treating the seed to produce a treated seed, the treatment comprising application of a formulation comprising:
        macronutrients;
        micronutrients;
        an antimicrobial agent; and
        at least one member of the group consisting of lemon extract, cayenne, garlic extract, peppermint oil, humic acid and fulvic acid; and
    storing the treated seed prior to planting; wherein the treating of the seed increases the germination rate of the seed by as much as 11% and extends the optimal time for planting the seed.

2. A seed treated by the method of claim 1.

3. A method of planting the seed of claim 2 comprising planting said seed by aerial planting during land rehabilitation.

* * * * *